No. 794,610. PATENTED JULY 11, 1905.
R. H. GOLDSBOROUGH.
TURBINE.
APPLICATION FILED APR. 8, 1904.
6 SHEETS—SHEET 3.
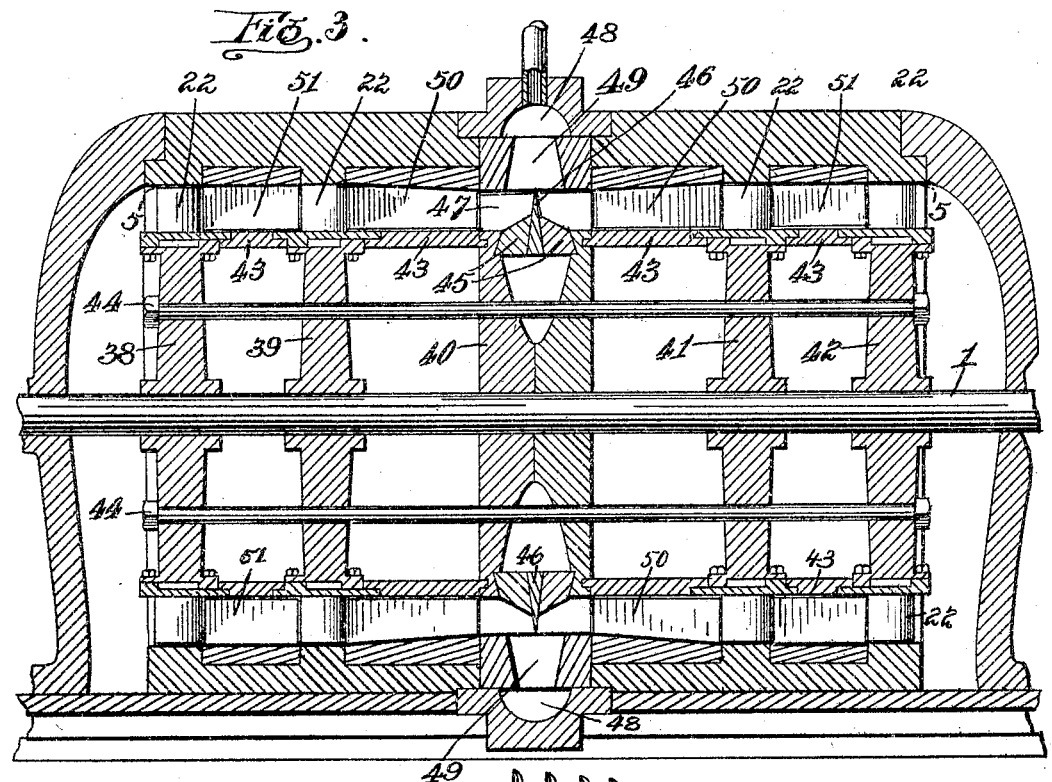
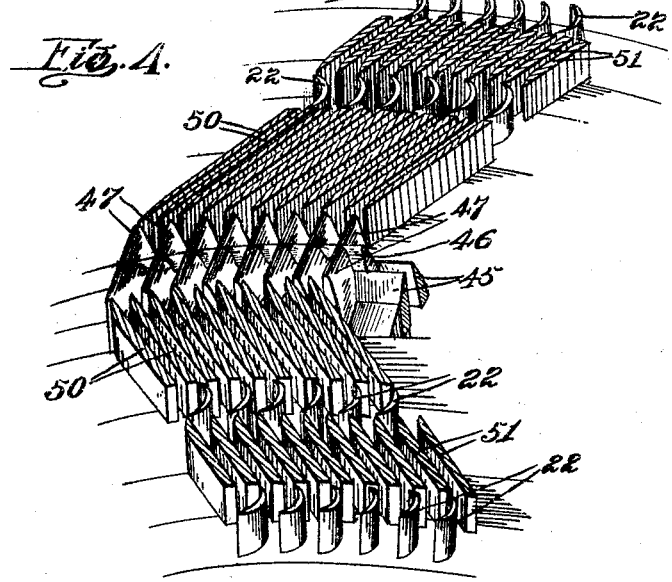
Witnesses
Eugene M. Hiney
H. A. Robinette
Inventor
Richard H. Goldsborough.
by
G. Ayres,
Attorney

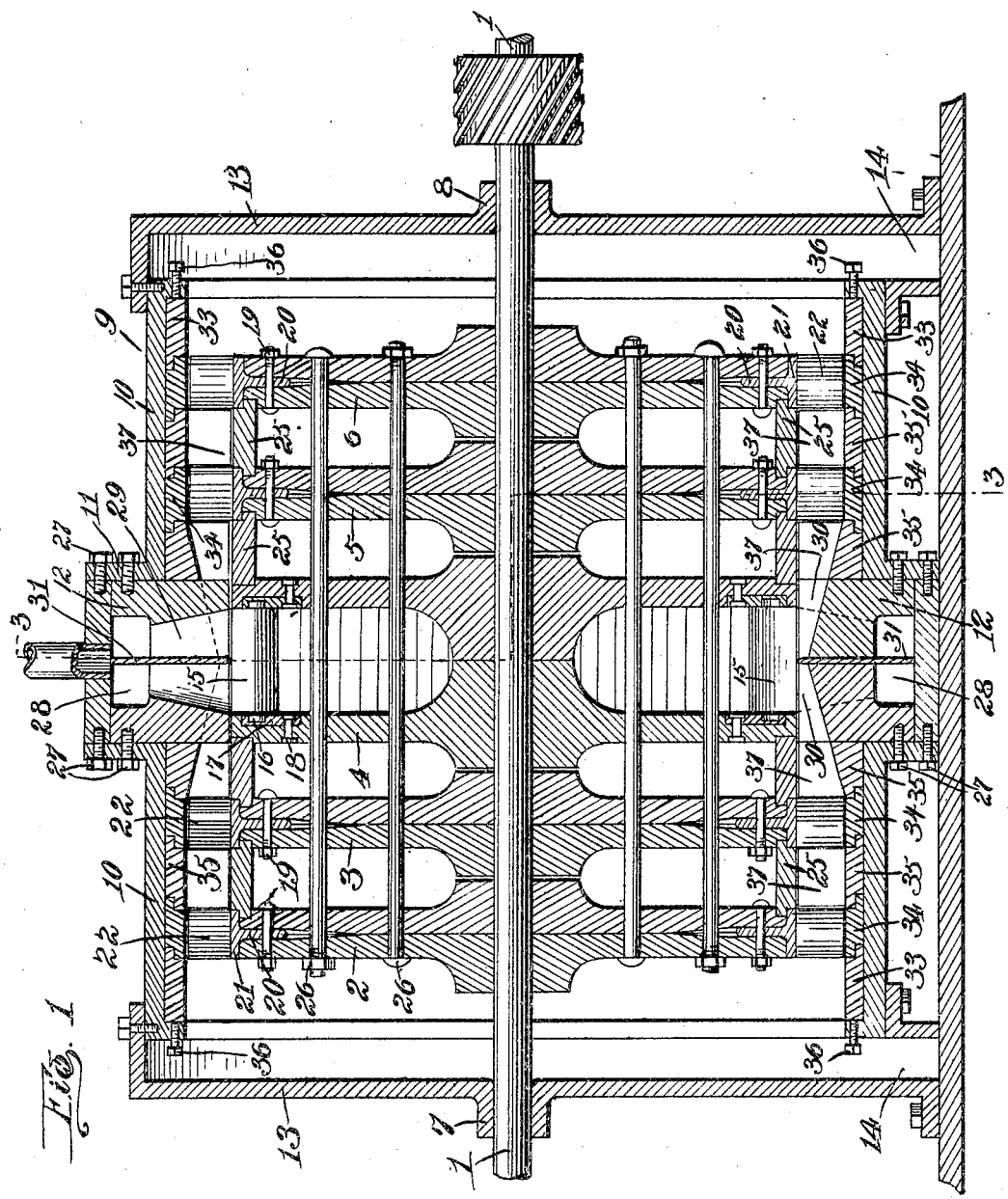

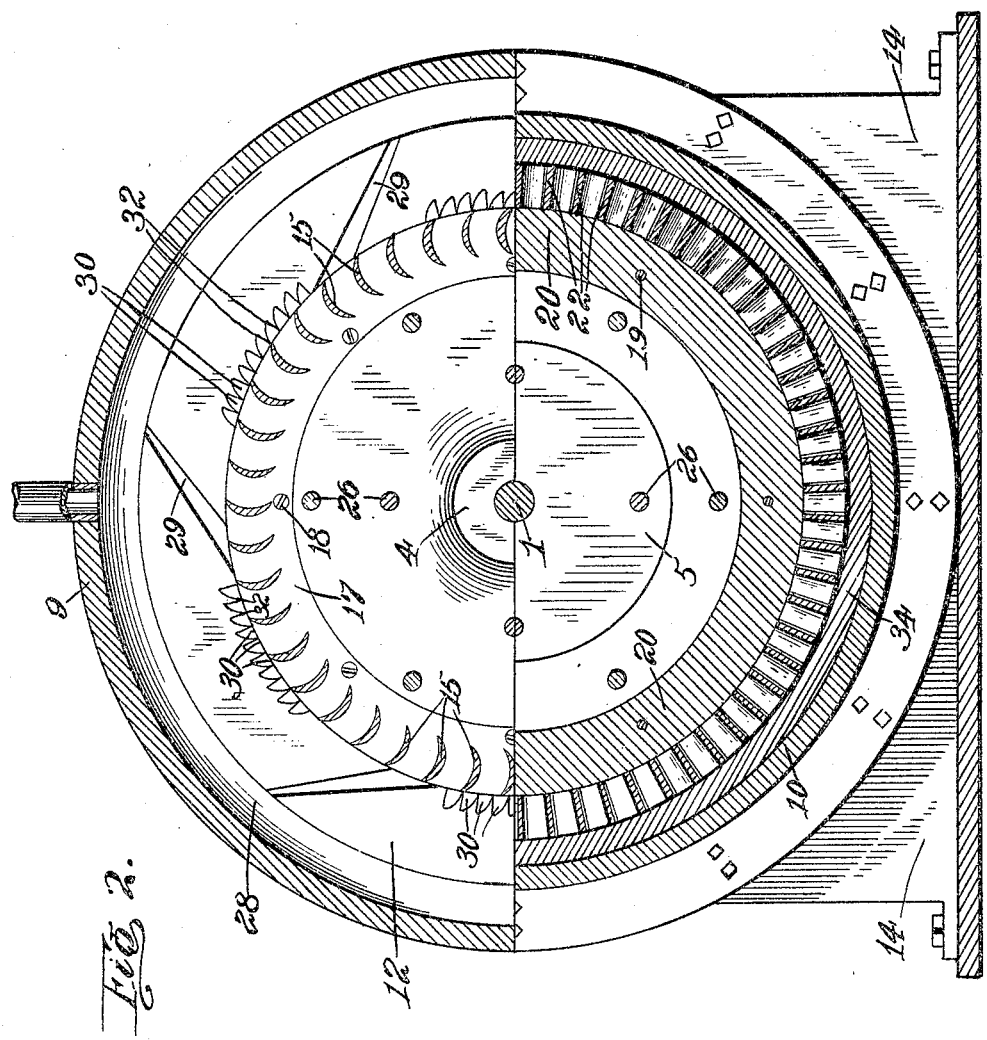

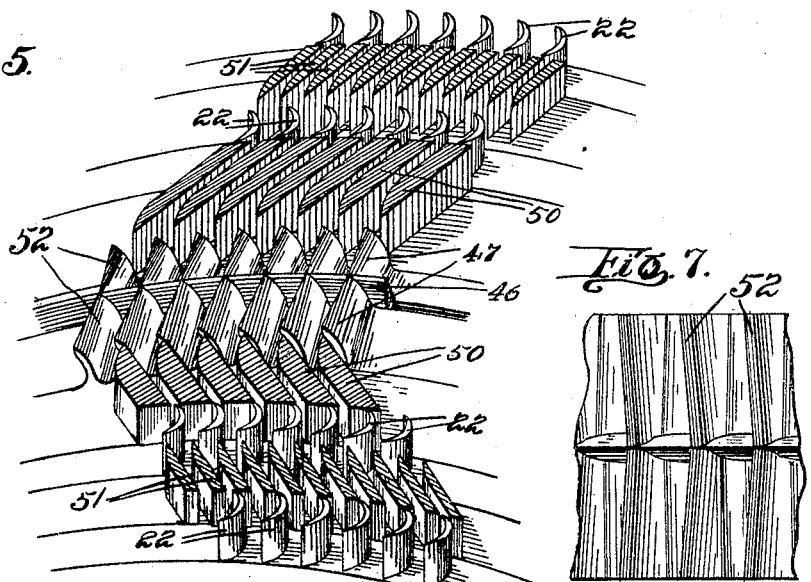
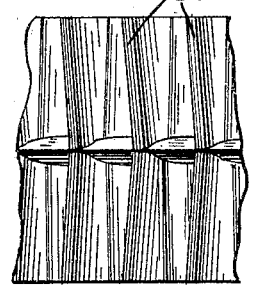
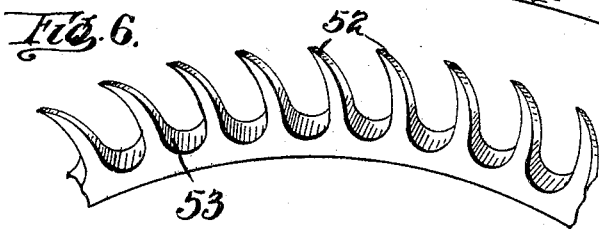
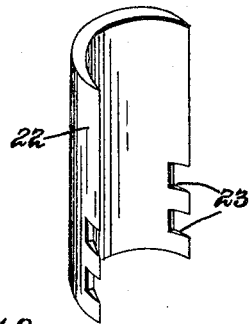
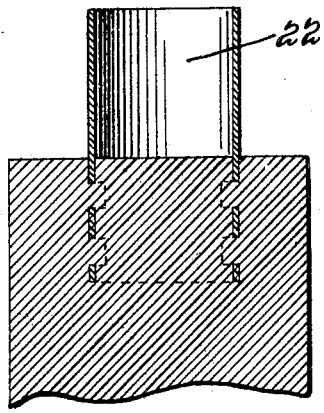
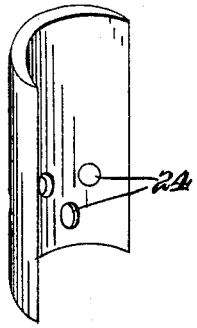

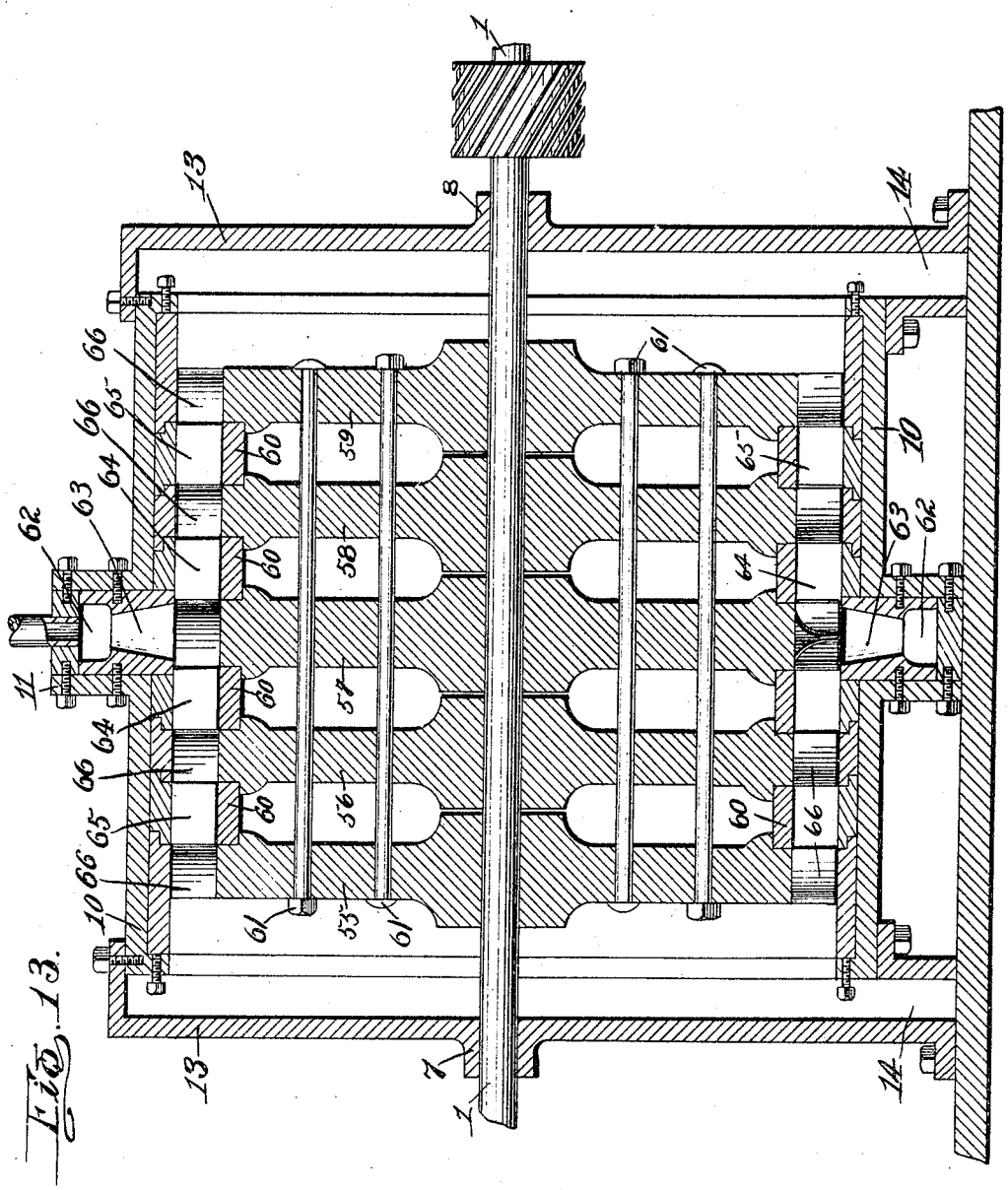

No. 794,610. Patented July 11, 1905.

UNITED STATES PATENT OFFICE.

RICHARD H. GOLDSBOROUGH, OF WASHINGTON, DISTRICT OF COLUMBIA.

TURBINE.

SPECIFICATION forming part of Letters Patent No. 794,610, dated July 11, 1905.

Application filed April 8, 1904. Serial No. 202,217.

*To all whom it may concern:*

Be it known that I, RICHARD H. GOLDSBOROUGH, a citizen of the United States, residing at Washington, in the District of Columbia, have invented certain new and useful Improvements in Turbines, of which the following is a specification.

My invention relates to an improvement in turbines; and it consists in the constructions, combinations, and arrangements herein described and claimed.

The objects of my invention are to provide a simple and efficient construction capable of economical operation at a relatively low speed under great variations of load.

A further object of my invention is to provide a perfectly-balanced construction free from bearings between the working parts and adapted for operation with a minimum friction loss and with no leakage from wear.

Figure 11:
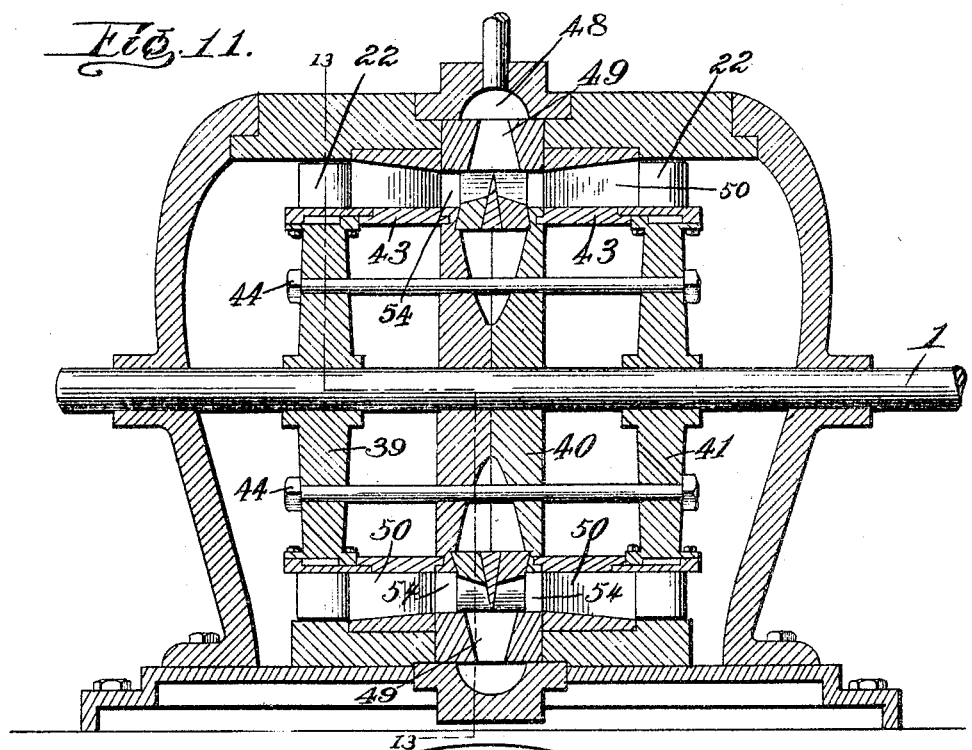
Figure 12:
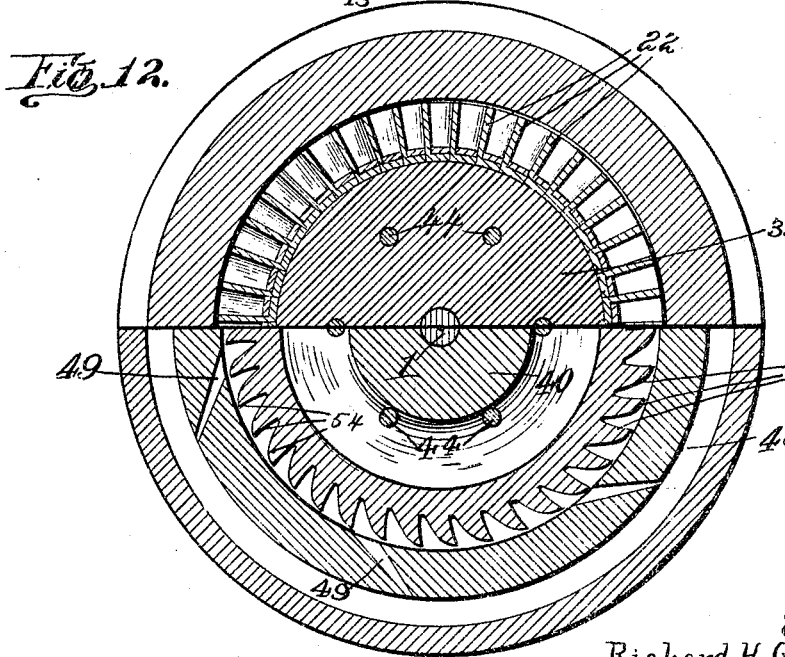

Referring to the accompanying drawings, forming a part of this application, and in which similar reference-symbols indicate corresponding parts in the several views, Figure 1 is a vertical axial sectional view of a three-stage compound turbine, illustrating one construction embodying my invention. Fig. 2 is a sectional view on the line 3 3 of Fig. 1. Fig. 3 is a vertical axial view illustrating a modified construction. Fig. 4 is a detail perspective view, taken on the line 5 5 of Fig. 3. Fig. 5 is a detail perspective view similar to Fig. 4, illustrating a modified construction and arrangement of turbine-vanes. Fig. 6 is a side elevation, on a larger scale, showing one of the two rings constituting the central series of turbine-vanes illustrated in Fig. 5. Fig. 7 is a detail plan view, on a larger scale, of the central series of turbine-vanes shown in Fig. 5. Fig. 8 is a detail sectional view illustrating one means of securing the vanes to their wheels by casting. Fig. 9 is a perspective view showing one of the vanes prepared for casting the wheel about its base. Fig. 10 is a view similar to Fig. 9, illustrating a modified construction. Fig. 11 is a vertical axial view of a compound two-stage turbine, illustrating a modified construction. Fig. 12 is a sectional view on the line 13 13 of Fig. 11, and Fig. 13 is a vertical axial sectional view illustrating a construction in which the central series of turbine-vanes are of the Pelton bucket type.

Referring especially to Figs. 1 and 2 of the drawings, 1 indicates a turbine-shaft carrying the turbine-wheels 2, 3, 4, 5, and 6 and suitably journaled at 7 and 8 in the turbine-casing 9. The turbine-casing preferably comprises two cylindrical portions 10, provided with annular flanges 11, adapted to embrace a central annular member 12, and of two end portions 13, constructed to be secured over the ends of the cylindrical portions 10 and provided with hollow legs 14, which constitute passages for leading the exhaust from the turbine-casing.

The central turbine-wheel 4 carries an annular series of curved vanes 15, which are shown provided with end projections 16, fitting recesses in two flat rings 17, which latter are suitably secured in annular recesses formed in the inner walls of the hollow wheel 4, as by bolts 18.

Each of the wheels 2, 3, 5, and 6 is shown, comprising two disk-shaped parts provided with bolts 19, clamping therebetween the web 20 of an annular base 21, which carries a series of curved vanes 22. The vanes 22 may be secured to their base 21 by casting the latter about their inner ends, or they may be machined or otherwise formed on or secured to such base. Figs. 8, 9, and 10 illustrate a satisfactory alternative construction of the wheels 2, 3, 5, and 6, in which the vanes 22 are securely held on the wheels by casting the latter directly about a portion of said vanes, the vanes being preferably provided with notches 23 or apertures 24 for insuring a satisfactory union of the metal cast thereabout.

Annular spacing members 25 are clamped in position between the several turbine-wheels by a plurality of bolts 26, which secure the several turbine-wheels and spacing members rigidly together in order that they may constitute a single rotating part. The spacing members are shown offset into the adjacent turbine-wheels and arranged with their outer peripheries substantially flush with the inner peripheries of the annular series of vanes 22;

but other forms and arrangements could be employed within the spirit and scope of my invention.

The central annular member 12 is secured by bolts 27 to the cylindrical portions 10 of the turbine-casing and is provided with an annular steam-chamber 28, from which lead a plurality of ports 29, constructed to direct the steam at an efficient angle against the annular series of vanes 15. The inner periphery of the annular member 12 is provided at points intermediate of the admission-ports 29 with a series of exhaust-ports 30, which are preferably formed to cause a substantial reversal of the steam flowing therethrough and to direct it forwardly in the direction of rotation of the turbine-wheel. The exhaust-ports may be formed of uniform area throughout their lengths in order to permit of only a lineal expansion of the steam flowing therethrough, or they may be constructed of gradually-increasing area as they extend from the center of the annular member 12 to permit any desired lateral expansion of the steam passing through them, as shown especially in the lower portion of Fig. 1. The central annular member 12 is shown comprising two similar portions for convenience in forming the admission and exhaust ports therein and to permit the insertion of a diaphragm or partition 31 between such parts. The diaphragm 31 tends to insure an equal flow of the steam laterally in both directions from the center of the annular series of vanes 15; but its employment is not essential to my invention and the central annular member 12 could be satisfactorily formed of a single part, if desired. The diaphragm 31 and the abutments 32 between the several exhaust-ports are preferably tapered to a knife-edge adjacent the periphery of the annular series of vanes 15, as clearly shown in Figs. 1 and 2. A plurality of rings 33, 34, and 35 are shown formed with interlocking joints and accurately positioned in the turbine-casing by means of adjusting-screws 36. In this construction any desired delicacy of adjustment can be obtained by inserting suitable liners between any of the several rings or between the central member 12 and the adjacent rings 35.

The rings 34 are formed to closely approximate the outer peripheries of the corresponding annular series of vanes 22, and the rings 35 are provided with steam-ports 37 and formed of sufficient thickness to bring their inner peripheries adjacent the outer peripheries of the corresponding spacing members 25. The steam-passages 37 may be formed either of uniform or of increasing area along their lengths, according to whether it be desired to provide for merely a lineal expansion or for a lateral expansion of the steam flowing therethrough.

In the operation of my invention steam or other actuating medium is maintained at any desired pressure in the annular chamber 28 and flows therefrom through the ports 29 at an efficient angle against the periphery of the annular series of vanes 15. The vanes 15 are preferably formed to produce a practical reversal of the steam impinging thereon and to deflect the steam into the interior of the central hollow wheel 4. The steam so deflected into the interior of the wheel recurves and impinges against the vanes 15 at an efficient angle in passing outward therethrough along the path of least resistance to the exhaust-ports 32, thus producing a second useful impact against said vanes 15. The steam deflected by the vanes 15 in passing out therethrough impinges against the stationary abutments 32, thereby producing a reaction which exerts a useful turning force on the turbine-wheel. The steam impinging against the stationary abutments 32 is deflected laterally thereby in both directions through the exhaust-ports 30 into the corresponding steam-passages 37, which are constructed to direct it at an efficient angle against the adjacent series of annular vanes 22. The vanes 22 are preferably constructed to produce a practical reversal of the steam impinging thereon and to deflect the same into the following set of steam-passages 37, which are arranged to direct it at an efficient angle against the adjacent series of annular vanes 22. The steam is deflected from said last annular series of vanes 22 into the turbine-casing, from which it may be led to a condenser or to the atmosphere, or the casing may be provided with the usual condensing sprays or coils to itself constitute a condenser. Figs. 1 and 2 illustrate a five-wheel turbine; but it is obvious that any desired degree and character of expansion can be obtained by employing a greater or less number of duplicate wheels and intermediate parts.

Figs. 3 and 4 illustrate a modification which differs mainly from the construction illustrated in Fig. 1 in the form of the central turbine-wheel and in the manner of securing the vanes 22 to their respective wheels. In this modification the turbine-wheels 38, 39, 40, 41, and 42 and the spacing members 43 are secured together by bolts 44 to constitute a single rotating part in a manner similar to that described in the construction of Figs. 1 and 2. As shown in Fig. 3, the central turbine-wheel 40 comprises two disk-shaped portions, between which are clamped two annular members 45 and an annular diaphragm 46, which are constructed to constitute suitable vanes for said wheel. The vanes 47 of said annular members may be machined on or cast in or otherwise secured thereto, and said vanes and the diaphragm 46 are preferably tapered to a knife-edge at their outer edges. The vanes 47 are shown extending approximately parallel to the axis of the turbine-shaft 1; but they could obviously be inclined to deflect the steam impinging thereon forwardly in the direction of rotation of the turbine-wheel, or vice versa, if desired. In the operation of this construction steam is maintained at any desired pressure in the annular chamber 48, from which it is directed by a plurality of ports 49 at an efficient angle against the vanes 47. The vanes 47 are constructed to deflect the steam in any desired degree and to discharge the same into the adjacent series of ports 50, which latter direct it at an efficient angle against the corresponding series of vanes 22. The steam is discharged from the vanes 22 into the series of ports 51, which direct it at an efficient angle against the final series of vanes 22, which latter are shown discharging directly into the turbine-casing. The general construction and arrangement of this modification is similar to that of Figs. 1 and 2, and will be clear without further detail description.

Figs. 5, 6, and 7 are views showing a slight modification of the construction illustrated in Fig. 4, in which the vanes 52 of the central turbine-wheel are curved in the direction of their heights and formed with concave bases 53, as clearly shown in Fig. 6. In this construction the parts are arranged to provide annular chambers between the discharge ends of the several annular series of vanes and the adjacent ports. These annular chambers receive the exhaust from the annular series of vanes and tend to equalize the pressure at the entrance-orifices of the several ports of the following series.

Figs. 11 and 12 illustrate a compound two-stage turbine similar in construction to that shown in Fig. 3, in which annular chambers 54 are provided between the discharge ends of the vanes on the central turbine-wheel and the entrance-orifices of the adjacent steam-ports 50.

Fig. 13 illustrates a compound turbine provided with a single rotating part comprising the wheels 55, 56, 57, 58, and 59 and their intermediary spacing members 60 rigidly secured together by a plurality of bolts 61. In this construction the central wheel 57 is provided with vanes of the Pelton type, and the remaining wheels carry annular series of suitably-formed vanes. In the operation of this construction steam from the annular chamber 62 is directed by a plurality of ports 63 at an efficient angle against the vanes of the central wheel 57, from which it is deflected laterally through the successive series of steam-passages 64 and 65 and annular series of vanes 66 and discharged into the turbine-casing, as fully described in reference to the construction illustrated in Figs. 1, 2, and 3.

It will be seen from the above description that my invention provides a perfectly-balanced construction which contains no bearings between the working parts and is capable of being conveniently and accurately adjusted.

Having thus described my invention, what I claim as new, and desire to secure by Letters Patent, is—

1. In a compound turbine, the combination of a single rotating part provided with a plurality of annular series of vanes, a plurality of admission-ports arranged to direct a fluid medium against the outer periphery of the central series of said plurality of series of vanes and through said vanes into the interior of said rotating part, exhaust-ports arranged adjacent the outer periphery of said central series of vanes, and constructed to receive the fluid medium from the interior of said rotating part and to deflect the same laterally in both directions, and a plurality of lateral passages arranged to receive the fluid medium from said exhaust-ports and to direct the same at an efficient angle against the adjacent series of vanes, substantially as described.

2. In a compound turbine, the combination of a single rotating part provided with a plurality of annular series of vanes, a plurality of admission-ports arranged to direct a fluid medium against the outer periphery of the central series of said plurality of series of vanes and through said vanes into the interior of said rotating part, exhaust-ports arranged adjacent the outer periphery of said central series of vanes at points intermediate said admission-ports and constructed to receive the fluid medium from the interior of said rotating part and to deflect the same laterally in both directions, and a plurality of lateral passages arranged to receive the fluid medium from said exhaust-ports and to direct the same at an efficient angle against the adjacent series of vanes, substantially as described.

3. In a compound turbine, the combination of a single rotating part provided with a plurality of annular series of vanes, a plurality of admission-ports arranged to direct a fluid medium against the outer periphery of said central series of said plurality of series of vanes and through said vanes into the interior of said rotating part, exhaust-ports arranged adjacent the outer periphery of said central series of vanes at points intermediate said admission-ports and constructed to receive the fluid medium from the interior of said rotating part and to deflect the same laterally in both directions, a diaphragm extending across the center of each of said exhaust-ports for equalizing the flow in both lateral directions therethrough, and a plurality of lateral passages arranged to receive the fluid medium from said exhaust-ports and to direct the same at an efficient angle against the adjacent series of vanes, substantially as described.

4. In a compound turbine, the combination of a single rotating part provided with a plurality of annular series of vanes, a plurality of admission-ports arranged to direct a fluid medium against the central series of said plurality of series of vanes, exhaust-ports arranged adjacent said central series of vanes and provided with partition-walls constituting abutments constructed to deflect the fluid medium laterally in both directions, and a plurality of lateral passages arranged to receive the fluid medium from said exhaust-ports and to direct the same at an efficient angle against the adjacent series of vanes, substantially as described.

5. In a compound turbine, the combination of a single rotating part provided with a plurality of annular series of vanes, a plurality of admission-ports arranged to direct a fluid medium against the central series of said plurality of series of vanes, exhaust-ports arranged about the outer periphery of said central series of vanes and provided with partition-walls constituting abutments constructed to deflect the fluid medium laterally in both directions, and a plurality of lateral passages arranged to receive the fluid medium from said exhaust-ports and to direct the same at an efficient angle against the adjacent series of vanes, substantially as described.

6. In a compound turbine, the combination of a single rotating part provided with a plurality of annular series of vanes, a plurality of admission-ports arranged to direct a fluid medium against the central series of said plurality of series of vanes, exhaust-ports arranged about the outer periphery of said central series of vanes at points intermediate said admission-ports and constructed to deflect the fluid medium laterally in both directions, and a plurality of lateral passages arranged to receive the fluid medium from the exhaust-ports and to direct the same at an efficient angle against the adjacent series of vanes, substantially as described.

7. In a compound turbine, the combination of a plurality of turbine-wheels carrying a series of vanes, spacing members positioned between said several wheels, means constructed to clamp said wheels and spacing members together to constitute a single rotating part, means constructed to direct a fluid medium against the outer periphery of the central series of vanes, and means constructed to conduct the fluid medium laterally in both directions from said central series of vanes and to direct it at an efficient angle against the remaining series of vanes, substantially as described.

8. In a compound turbine, the combination of a central hollow wheel carrying an annular series of vanes arranged with their outer edges lying substantially in the periphery thereof, a plurality of turbine-wheels arranged laterally to said central wheel and carrying annular series of vanes, spacing members positioned between said several wheels, means constructed to clamp said wheels and spacing members together to constitute a single rotating part, means constructed to direct a fluid medium against the outer periphery of the annular series of vanes carried by said central wheel, and means constructed to conduct the fluid medium from such vanes and to direct it at an efficient angle against the remaining series of vanes, substantially as described.

9. In a compound turbine, the combination of a central hollow wheel carrying an annular series of vanes arranged with their outer edges lying substantially in the periphery thereof, a plurality of turbine-wheels arranged laterally to said central wheel and carrying annular series of vanes extending from their peripheries, means constructed to direct a fluid medium against the outer periphery of the annular series of vanes carried by said central wheel, and means constructed to conduct the fluid medium from such vanes and to direct it at an efficient angle against the remaining series of vanes, substantially as described.

10. In a compound turbine, the combination of a central hollow wheel carrying an annular series of vanes arranged with their outer edges lying substantially in the periphery thereof, a plurality of turbine-wheels arranged laterally to said central wheel and carrying annular series of vanes extending from their peripheries, annular spacing members positioned between said several wheels and constructed to have their outer peripheries register with those of the adjacent wheels, means constructed to clamp said wheels and spacing members together to constitute a single rotating part, and means constructed to direct a fluid medium at an efficient angle against the vanes of said several wheels, substantially as described.

11. In a compound turbine, the combination of a plurality of turbine-wheels and spacing members of substantially equal diameter, means constructed to clamp said wheels and spacing members together to constitute a single rotating part, an annular series of vanes extending inwardly from the periphery of the central turbine-wheel, annular series of vanes extending outwardly from the peripheries of the remaining turbine-wheels, means constructed to direct a fluid medium against the outer periphery of the said central series of vanes, and means constructed to conduct the fluid medium from such vanes and to direct it at an efficient angle against the remaining series of vanes, substantially as described.

12. In a compound turbine, the combination of a central hollow wheel carrying an annular series of vanes arranged with their outer edges lying substantially in the periphery thereof, a plurality of turbine-wheels arranged laterally to said central wheel, each of said laterally-arranged wheels comprising two disks, an annular base member carrying a series of vanes extending outwardly from the periphery thereof and provided with an inwardly-extending radial flange, means constructed to clamp said radial flanges between the disks of said laterally-arranged wheels, spacing members arranged between said several wheels, means constructed to clamp said wheels and spacing members together to constitute a single rotating part, and means constructed to direct a fluid medium at an efficient angle against said several series of vanes, substantially as described.

13. In a compound turbine, the combination of a central hollow wheel carrying an annular series of vanes arranged with their outer edges lying substantially in the periphery thereof, a plurality of turbine-wheels arranged laterally to said central wheel and carrying annular series of vanes, spacing members positioned between said several wheels, means constructed to clamp said wheels and spacing members together to constitute a single rotating part, and means constructed to direct a fluid medium at an efficient angle against said several series of vanes substantially as described.

14. In a compound turbine, the combination of a hollow wheel carrying an annular series of vanes arranged with their outer edges lying substantially in the periphery thereof, a plurality of turbine-wheels arranged laterally to said hollow wheel and carrying annular series of vanes, spacing members positioned between said several wheels, means constructed to clamp said wheels and spacing members together to constitute a single rotating part, means constructed to direct a fluid medium against the outer periphery of the annular sesies of vanes carried by said hollow wheel, and means constructed to conduct the fluid medium from such vanes and to direct it at an efficient angle against the remaining series of vanes, substantially as described.

15. In a turbine-engine, the combination of a casing, a shaft revoluble in the casing, a piston secured to said shaft having buckets, and a plurality of tubes for directing jets of steam against said buckets, said casing having a plurality of longitudinal exhaust-passages between each two adjacent tubes at the circumference of the piston.

16. In a turbine-engine, the combination of a casing, a shaft revoluble in the casing, a hollow piston secured to said shaft and having inclined buckets near its circumference, tubes for directing jet of steam against said buckets, said casing having longitudinal interior corrugations forming exhaust-ports between said tubes, the piston being so constructed that the steam acting against the buckets passes into the piston, and expanding, passes out, and thence through said corrugations thus adding to the force applied to the piston.

17. In a turbine-engine, the combination of a casing, a shaft revoluble in said casing, a piston comprising parallel rings and a ring of curved buckets secured near to and between the outer edges of said rings and forming acute angles with said edges, tubes for directing jets of steam tangentially against said buckets, the steam passing into the piston between the buckets and there expanding, said casing having longitudinal exhaust-passages at the circumference of said piston in advance of the discharge-openings of said tubes, the steam passing out of the piston between said buckets expanding and reacting between the walls of the exhaust-passages and said buckets.

18. In a turbine-engine, a casing, a shaft revoluble in said casing, a piston comprising parallel rings and a ring of buckets secured near to and between the outer edges of said rings, said piston secured to the shaft, and tubes for directing jets of steam tangentially against said buckets, said casing having longitudinal exhaust-passages at the circumference of said piston in advance of the discharge-openings of said tubes.

In testimony whereof I affix my signature in presence of two witnesses.

RICHARD H. GOLDSBOROUGH.

Witnesses:
G. AYRES,
EDWIN S. CLARKSON.